(12) United States Patent
Sim

(10) Patent No.: US 6,876,693 B2
(45) Date of Patent: Apr. 5, 2005

(54) METHOD FOR PROCESSING SIGNAL IN COMMUNICATIONS SYSTEM HAVING PLURALITY ANTENNAS

(75) Inventor: Dong Hi Sim, Seoul (KR)

(73) Assignee: LG Electronics Inc., Seoul (KR)

( * ) Notice: Subject to any disclaimer, the term of this patent is extended or adjusted under 35 U.S.C. 154(b) by 761 days.

(21) Appl. No.: 09/942,999

(22) Filed: Aug. 31, 2001

(65) Prior Publication Data

US 2002/0044616 A1 Apr. 18, 2002

(30) Foreign Application Priority Data

Sep. 2, 2000 (KR) ...................... P2000-51856

(51) Int. Cl.$^7$ ............................................. H04L 27/30
(52) U.S. Cl. ....................... 375/144; 375/148; 375/267; 375/347; 375/349; 455/303; 370/334; 370/479; 342/373; 342/382
(58) Field of Search ................................ 375/144, 148, 375/267, 285, 346, 347, 349; 455/50.1, 52.3, 52.1, 63, 65, 67.3, 296, 303; 370/317, 320, 334, 335, 342, 441, 479; 342/368–384, 457

(56) References Cited

U.S. PATENT DOCUMENTS

| | | | |
|---|---|---|---|
| 5,299,148 A | | 3/1994 | Gardner et al. ............. 364/574 |
| 5,808,913 A | * | 9/1998 | Choi et al. ................... 702/191 |
| 6,141,393 A | * | 10/2000 | Thomas et al. ............. 375/347 |
| 6,587,451 B1 | * | 7/2003 | Kwon et al. ................. 370/339 |
| 6,597,678 B1 | * | 7/2003 | Kuwahara et al. .......... 370/342 |

FOREIGN PATENT DOCUMENTS

| | | |
|---|---|---|
| WO | WO 98/38772 | 9/1998 |
| WO | WO 99/31820 | 6/1999 |

OTHER PUBLICATIONS

Shim et al., "Performance Analysis of a Smart Antenna System with a Blind Adaptive Algorithm", Advanced Telecommunications Research (ATRA) Lab.

Lee, Y.P., et al.; Oceans '93. Engineering in harmony with ocean; Oct. 1993, New York, NY, IEEE, pp. III–75–III–80 (XP–002199882).

* cited by examiner

*Primary Examiner*—Dac V. Ha
(74) *Attorney, Agent, or Firm*—Fleshner & Kim, LLP

(57) ABSTRACT

The present invention relates to an adaptive algorithm and device for the same, for calculating a weight vector to be applied to an adaptive array antenna system, suggesting an adaptive algorithm suitable for calculating an autocovariance matrix of signal vectors of signals received from antennas before despreading in a known channel code, and an autocovariance matrix of signal vectors of signals received from antennas after being despread in the known channel code. Particularly, the calculation is carried out with the autocovariance matrix of the signal vector before the despread divided into diagonal components and non-diagonal components.

15 Claims, 3 Drawing Sheets

METHOD FOR PROCESSING SIGNAL IN COMMUNICATIONS SYSTEM HAVING PLURALITY ANTENNAS

BACKGROUND OF THE INVENTION

1. Field of the Invention

The present invention relates to a communication system, and more particularly, to a method for processing signal in communication system having plurality antennas.

2. Background of the Related Art

In general, in a radio communication, a received signal includes a desired signal (hereafter called as 'original signal') as well as interferential signals, wherein there are in general a plurality of interferential signals for one original signal. Since an extent of a communication distortion caused by the interferential signals is fixed by a sum of an original signal power and all interferential signal powers, even if a level of the original signal is significantly higher than each of the levels of the interferential signals, the communication distortion may be occurred if a number of the interferential signals are great, to make a total power of the interferential signals great. FIG. 1 illustrates a related art method for forming a beam in an array antenna system.

Referring to FIG. 1, the related art array antenna system using method for CDMA (code division multiple access) type radio link is provided with a frequency down converter 101 for converting a very high frequency signal received at an antenna to a base band signal, an analog to digital converter 102 for digitizing the base band signal, a first multiplier 103 for despreading the digital signal, an integrator 104, a second multiplier 105 for applying a weight vector to a desired signal to obtain a greater gain of the desired signal, a beam former 106 for spatial processing of the desired signal, and an array forwarder 107 for synthesizing, and forwarding the signals having the weight vectors applied thereto.

A related art method for forming a beam of the foregoing array antenna will be explained.

The frequency down converter 101 converts a signal received through each antenna element into a baseband analog signal, which is then digitized at the analog to digital converter 102. The first multiplier 103 and the integrator 104 despread the digitized signal and extract only a desired signal therefrom. The second multiplier 105 applies a weight vector to the extracted signal. The signals having the weight vectors applied thereto are synthesized at the array forwarder 107, and forwarded to a demodulator (not shown). The weight vector provided by the beam former 106, which renews the weight vector from output signals of the analog to digital converter 102 and output signals of the integrator 104. The output signals from the analog to digital converter 102 are high rate signals before being despread in a code the CDMA system knows already, and the output signals from the integrator 104 are low rate signals after being despread in a code the CDMA system knows already.

In the related art, an autocovariance matrix of signals sampled from the signals before being despread is calculated, an autocovariance matrix of signals sampled from the signals after being despread is calculated, and the weight vector for the spatial processing is calculated from the matrices.

However, the adaptive algorithm for the adaptive array antenna in the related art requires altering a generalized eigenvalue problem to an eigenvalue problem of only one matrix. In the altering process, it is required to divide one of two matrices in the generalized eigenvalue problem into two matrices again by utilizing that the matrices in the generalized eigenvalue problem are 'positive definite' matrices, and to obtain inverse matrices of the two divided matrices, which is cumbersome, and not suitable for use as a real time adaptive array algorithm due to too much calculation required.

SUMMARY OF THE INVENTION

Accordingly, the present invention is directed to a method for processing a signal in an adaptive antenna array system and a device for the same that substantially obviates one or more of the problems due to limitations and disadvantages of the related art.

An object of the present invention is to provide a method for processing a signal in an adaptive antenna array system, which facilitates a real time application of an adaptive algorithm in an adaptive array antenna.

Other object of the present invention is to provide a method for processing a signal in an adaptive antenna array system, and a device for the same, which can improve a communication quality in an adaptive array antenna.

Another object of the present invention is to provide a method for processing a signal in an adaptive antenna array system, and a device for the same, which is simple and saves cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is provided a method for processing a signal in a communication system having a plurality of antennas, including the steps of (a) extracting a first signal mostly including a specific signal, and a second signal mostly including a signal other than the specific signal, from a signal received at the plurality of antennas, (b) calculating an autocovariance matrix of each of the first and second signals, (c) dividing at least any on of the calculated autocovariance matrices into a diagonal component and a non-diagonal component, to separate the matrix into matrices of the components, (d) calculating a weighted value for the specific signal by using the separated autocovariance matrices, and (e) applying the weighted value to a transmission, or reception signal related to the specific signal, and forwarding a signal having the weighted value applied thereto.

In other objection of the invention, the communication system is a CDMA type radio communication system, and the first signal is a signal the received signal is despread in a particular code.

The second signal is a signal before the received signal is despread in a particular code.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incor- In the drawings.

DETAILED DESCRIPTION OF THE PREFERRED EMBODIMENT

Reference will now be made in detail to the preferred embodiments of the present invention, examples of which are illustrated in the accompanying drawings.

First Embodiment

Figure 1:
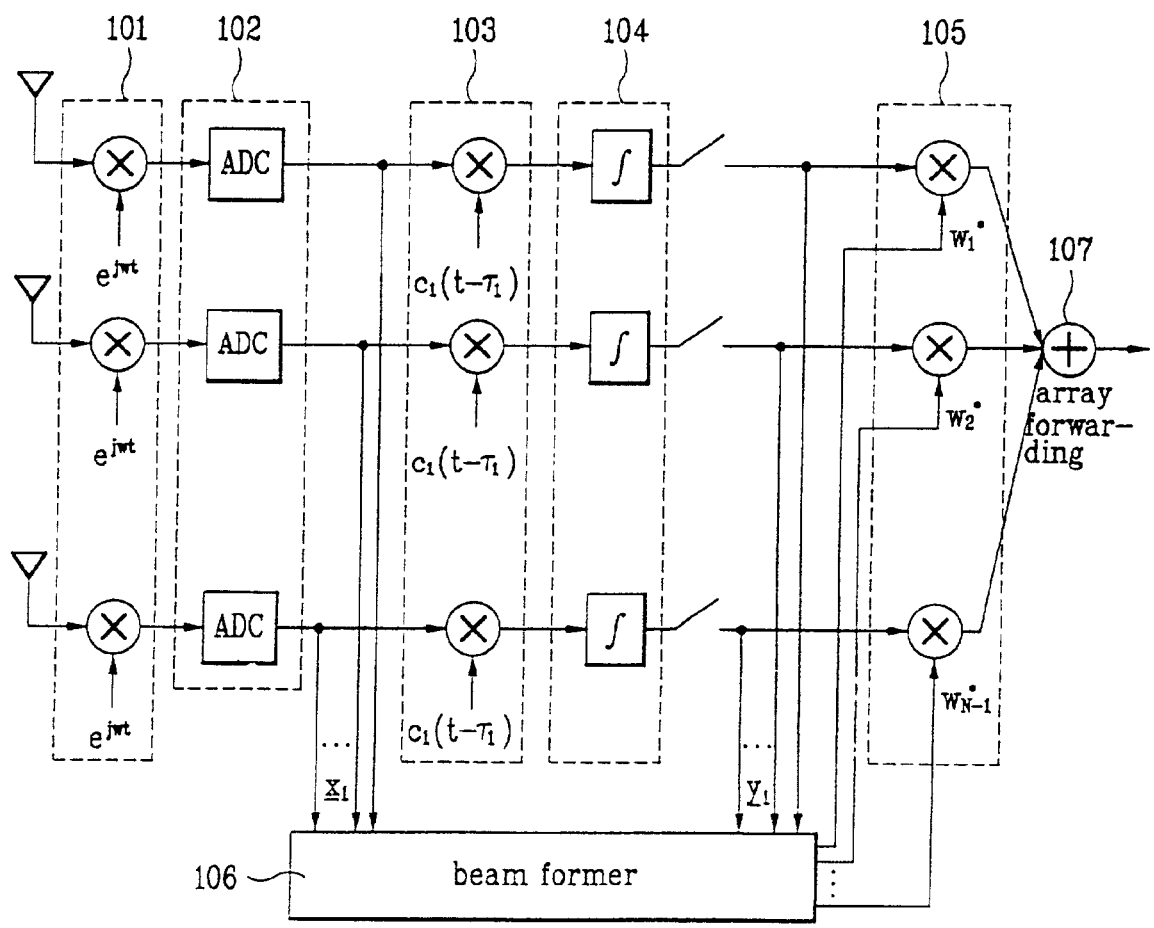
FIG. 1 illustrates a related art array antenna system.
Figure 2:
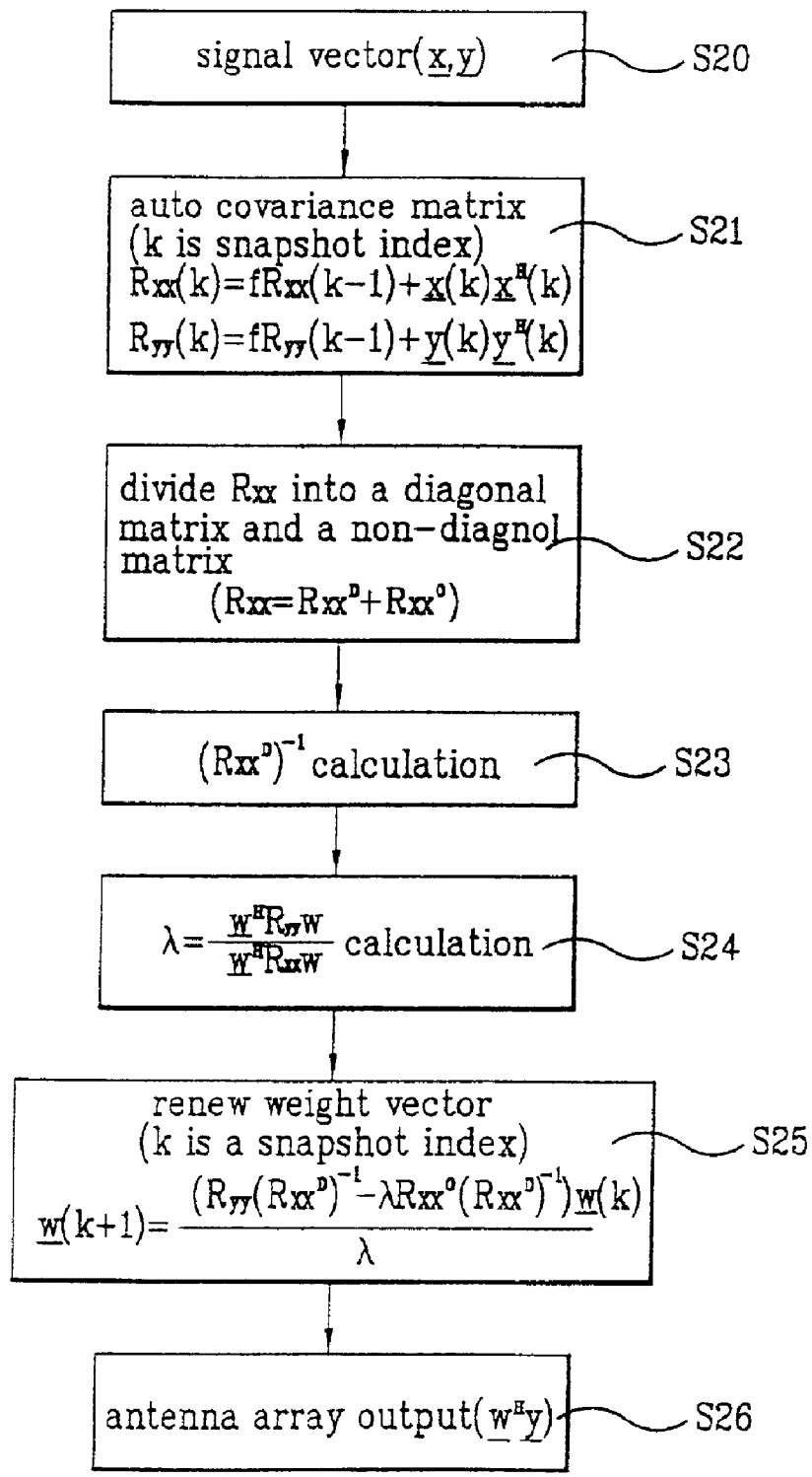
FIG. 2 illustrates a flow chart showing an adaptive algorithm in accordance with a referred embodiment of the present invention; and, FIG. 3 illustrates a flow chart showing an adaptive algorithm in accordance with another preferred embodiment of the present invention.

FIG. 2 illustrates a flow chart showing an adaptive algorithm in accordance with a preferred embodiment of the present invention.

As explained, the beam former 106 in the related art adaptive array antenna system in a CDMA system uses both the high rate signal before being despread, and the low rate signal after being despread by using known channel code, for renewal of the weight vector. Also, an autocovariance matrix of signals sampled from the signals before being despread is calculated, an autocovariance matrix of signals sampled from the signals after being despread is calculated, and the weight vector for the spatial processing is calculated from the matrices.

'$\underline{x}$' is defined as a vector of signals received at antennas, and $\underline{y}$ is defined as a vector of the signals received at the antennas and despread in a known code. (S20). When Rxx is defined as the autocovariance matrix of the vector $\underline{x}$, and Ryy is defined as the autocovariance matrix of the vector $\underline{y}$, an equation for obtaining $\underline{w}$, a weight vector having a complex gain to be applied to each antenna element, becomes a generalized Eigen value problem as shown in the following equation (1). (S21).

$$Ryy\underline{w}=\lambda Rxx\underline{w} \tag{1}$$

The autocovariance matrices Rxx, and Ryy can be estimated by the following equations (2), and (3), respectively.

$$Rxx(k)=fRxx(k-1)+\underline{x}(k)\underline{x}^H(k) \tag{2}$$

$$Ryy(k)=fRyy(k-1)+\underline{y}(k)\underline{y}^H(k) \tag{3}$$

Where, 'f' denotes a forgetting factor having a value ranging '0'~'1', and 'H' is a Hermitian operator.

Though matrix division and inverse matrix calculation are carried out in the equation (1) for obtaining the related art weight vector, the present invention suggests to divide the autocovaniance matrix Rxx into a diagonal matrix of diagonal elements, and a non-diagonal matrix of non-diagonal elements except the diagonal elements, as the following equation (4). (S22).

$$Ryy\underline{w}=\lambda(Rxx^D+Rxx^O)\underline{w} \tag{4}$$

Where, $Rxx^D$ denotes a matrix of diagonal elements of Rxx with the other elements being set '0', and $Rxx^O$ denotes a matrix of non-diagonal elements of Rxx with the diagonal elements being set '0'. The received signal vector $\underline{x}$ is a vector having a number of vector elements equal to, or less than a number of the antenna elements (or array). The autocovariance matrix Rxx or Ryy has a number of columns, or rows the same with a number of vector $\underline{x}$ elements of the received signal.

The equation (4) may be expressed in an equation (5), below.

$$Ryy\underline{w}-\lambda Rxx^O\underline{w}=\lambda Rxx^D\underline{w} \tag{5}$$

An inverse matrix of $Rxx^D$ is multiplied to both sides of the equation (5), and re-arranged as follows.

Though it is required to obtain the inverse matrix $Rxx^D$ in the present invention, since the inverse matrix $Rxx^D$ is a diagonal matrix, the inverse matrix can be calculated with easy as follows. (S23).

For an example, if the inverse matrix $Rxx^D$ can be expressed as an equation (6), an inverse matrix of the diagonal matrix, equation (6), can be obtained with easy by using a characteristic of the inverse matrix.

$$Rxx^D = \begin{bmatrix} D_1 & 0 & \cdots & 0 \\ 0 & D_2 & \cdots & 0 \\ \vdots & \vdots & \ddots & \vdots \\ 0 & 0 & \cdots & D_L \end{bmatrix} \tag{6}$$

$$(Rxx^D)^{-1} = \begin{bmatrix} D_1^{-1} & 0 & \cdots & 0 \\ 0 & D_2^{-1} & \cdots & 0 \\ \vdots & \vdots & \ddots & \vdots \\ 0 & 0 & \cdots & D_L^{-1} \end{bmatrix} \tag{7}$$

The equation (5) can be rearranged as follows according to the equation (7).

$$(Ryy-\lambda Rxx^O)(Rxx^D)^{-1}\underline{w}=\lambda\underline{w} \tag{8}$$

A greatest proper value $\lambda$ can be obtained from the equation (8) as follows. (S24).

$$\lambda = \frac{\underline{w}^H R_{yy}\underline{w}}{\underline{w}^H R_{xx}\underline{w}} \tag{9}$$

Therefore, the weight vector $\underline{w}$ can be expressed as the following equation (10).

$$\underline{w} = \frac{\{R_{yy}(R_{xx}^D)^{-1} - \lambda R_{xx}^O(R_{xx}^D)^{-1}\}\underline{w}}{\lambda} \tag{10}$$

In the equation (10), a number of elements of the calculated weight vector is the same with a number of columns, or rows of the autocovariance matrix Rxx or Ryy.

Because it is required that the weight vector $\underline{w}$ to be used in the adaptive array antenna is renewed continuously, and a moving object can be traced continuously under a mobile communication situation, the method for obtaining a weight vector $\underline{w}$ can be derived as an equation (11) from the equation (10).

$$\underline{w}(k+1) = \frac{\{R_{yy}(R_{xx}^D)^{-1} - \lambda R_{xx}^O(R_{xx}^D)^{-1}\}\underline{w}(k)}{\lambda} \tag{11}$$

Where, 'k' denotes an index representing a time point at which a new weight vector is calculated at detecting a signal incident to the adaptive array antenna. Thus, by calculating a weight vector appropriate to a newly incident signal value, the present invention can provide an array antenna system adaptive to the incident signal value at the time point, i.e., every snapshot. That is, by setting any initial weight vector, and renewing the initial weight vector continuously according to the equation (11), a converged weight vector can be obtained.

By taking a complex inner product of the obtained weight vector and vector $\underline{y}$, an array antenna output 'z' can be calculated as follows. (S26).

$$Z = \underline{w}^H \underline{y} \tag{12}$$

Figure 3:
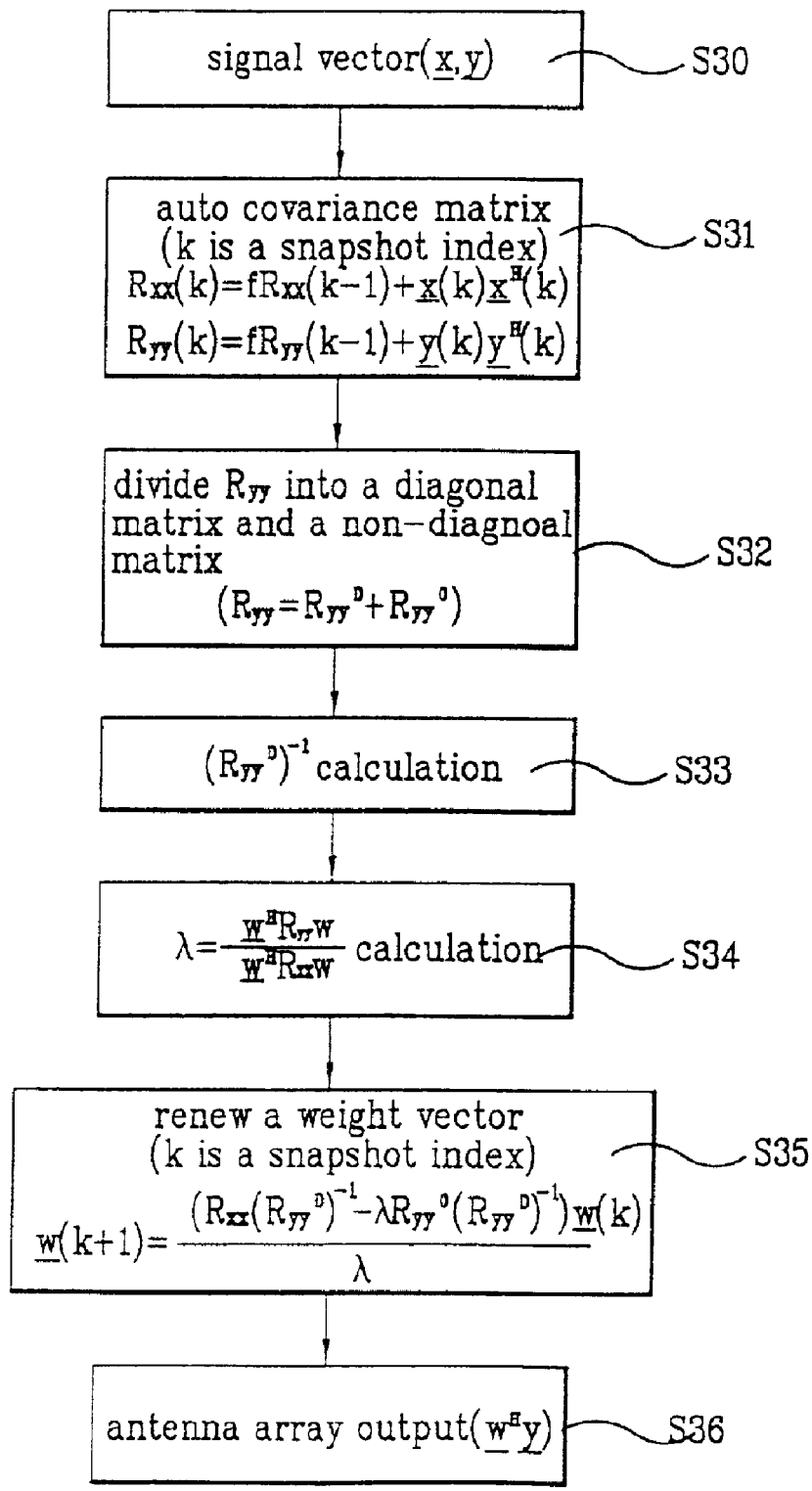

Referring to FIG. 3, the present invention suggests another method in which a signals received through the antennas are despread in a known code, the autocovariance matrix Ryy of the signal vector $\underline{y}$ is divided into a diagonal matrix and a non-diagonal matrix, and a weight vector is calculated by using the diagonal vector and the non-diagonal vector.

Second Embodiment

FIG. 3 illustrates a flow chart showing an adaptive algorithm in accordance with another preferred embodiment of the present invention.

Referring to FIG. 3, '$\underline{x}$' is defined as a vector of signals received at antennas, and $\underline{y}$ is defined as a vector of the signals received at the antennas, and despread in a known code. (S30). When Rxx is defined as the autocovariance matrix of the vector $\underline{x}$, and Ryy is defined as the autocovariance matrix of the vector $\underline{y}$, an equation for obtaining $\underline{w}$, a weight vector having a complex gain to be applied to each antenna element, becomes a generalized Eigen value problem the same as the equation (1). (S31). In this instance too, the autocovariance matrices Rxx and Ryy can be predicted by the equations (2) and (3) in FIG. 2.

Though matrix division and inverse matrix calculation are carried out in the equation (1) for obtaining the related art weight vector, the another embodiment of the present invention suggests to divide the autocovariance matrix Ryy into a diagonal matrix of diagonal elements, and a non-diagonal matrix of non-diagonal elements except the diagonal elements, as the following equation (13). (S32).

$$(Ryy^D + Ryy^O)\underline{w} = \lambda Rxx\underline{w} \tag{13}$$

Where, $Ryy^D$ denotes a matrix of diagonal elements of Ryy with all the other elements being set '0', and $Ryy^O$ denotes a matrix of non-diagonal elements of Ryy with the diagonal elements being set '0'. The received signal vector $\underline{x}$ is a vector having a number of vector elements equal to, or less than a number of the antenna elements (or array). The autocovariance matrix Rxx or Ryy has a number of columns, or rows the same with a number of vector $\underline{x}$ elements of the received signal.

The equation (13) may be expressed as an equation (14), below.

$$Ryy^D \underline{w} = \lambda Rxx\underline{w} - Ryy^O \underline{w} \tag{14}$$

An inverse matrix of $Ryy^D$ is multiplied to both sides of the equation (14), and re-arranged as follows, to express the weight vector $\underline{w}$ expressed as an equation (15), below. (S33).

$$\underline{w} = (\lambda Rxx\underline{w} - Ryy^O \underline{w})(Ryy^D)^{-1} \tag{15}$$

Alike in the case of FIG. 2, a greatest proper value $\lambda$ in the equation (15) can be obtained from the equation (9). Alike in the case of the equation (15), a number of elements of calculated weight vector is the same with a number of columns, or rows of the autocovariance matrix Rxx or Ryy.

Because it is required that the weight vector $\underline{w}$ to be used in the adaptive array antenna is renewed continuously, and a moving object can be traced continuously under a mobile communication situation, the method for obtaining a weight vector $\underline{w}$ up to now can be expressed as the following equation (16) from the equation (15) and the greatest proper value $\lambda$ calculated according to the equation (9).

$$\underline{w}(k+1) = \lambda Rxx\underline{w}(k)(Ryy^D)^{-1} - Ryy^O \underline{w}(k)(Ryy^D)^{-1} \tag{16}$$

Where, 'k' denotes an index representing a time point at which a new weight vector is calculated at detecting a signal incident to the adaptive array antenna. Thus, by calculating a weight vector appropriate to a newly incident signal value, the present invention can provide an array antenna system adaptive to the incident signal value at the time point, i.e., every snapshot. That is, by setting any initial weight vector, and renewing the initial weight vector continuously according to the equation (16), a converged weight vector can be obtained.

By taking a complex inner product of the obtained weight vector and vector $\underline{y}$, an array antenna output 'z' can be calculated as the same as the equation (12).

Thus, by carrying out the beam forming algorithm required for implementing an adaptive array antenna system in a CDMA system simply, the present invention can reduce an amount of calculation required for carrying out the beam forming algorithm. The present invention can produce a beam pattern of the adaptive array antenna in real time for full utilization of merits of the beam former which is required to trace moving objects under a mobile communication environment. Moreover, the application of the beam pattern (weight vector) renewed in real time can improve a communication quality. The application of a simple algorithm in implementation of the beam former made possible by the present invention permits to reduce a number of DSP, which saves cost.

It will be apparent to those skilled in the art that various modifications and variations an be made in the method for processing a signal in an adaptive antenna array system and the device for the same of the present invention without departing from the spirit or scope of the invention. Thus, it is intended that the present invention cover the modifications and variations of this invention provided they come within the scope of the appended claims and their equivalents.

What is claimed is:

1. A method for processing signal in a communication system having a plurality of antennas, comprising the steps of:

(a) extracting a first signal mostly including a specific signal, and a second signal mostly including a signal other than the specific signal, from a signal received at the plurality of antennas;

(b) calculating an autocovariance matrix of each of the first and second signals;

(c) dividing at least any one of the calculated autocovariance matrices into a diagonal component and a non-diagonal component, to separate the matrix into matrices of the components;

(d) calculating a weighted value for the specific signal by using the separated autocovariance matrices; and, (e) applying the weighted value to a transmission, or reception signal related to the specific signal, and forwarding a signal having the weighted value applied thereto.

2. A method as claimed in claim 1, wherein the communication system is a CDMA type radio communication system, and the first signal is a signal the received signal is despread in a particular code.

3. A method as claimed in claim 2, wherein the second signal is a signal before the received signal is despread in a particular code.

4. A method as claimed in claim 1, wherein the received signal includes a vector having a number of elements equal to, or less than a number of the antennas.

5. A method as claimed in claim 4, wherein the autocovariance matrix has a number of rows or columns the same with the number of elements of the vector of the received signal.

6. A method as claimed in claim 1, wherein the calculated weighted value is a vector having a number of element the same with the number of rows or columns of the autocovariance matrix.

7. A method as claimed in claim 1, wherein the step (d) includes the step of obtaining a weighted vector which leads a ratio of a product of the autocovariance of the first signal and the weighted value to a product of the autocovariance of the second signal and the weighted value to a maximum.

8. A method as claimed in claim 7, wherein the separated matrix is an autocovariance matrix of the first signal.

9. A method as claimed in claim 8, wherein the weight vector $\underline{w}$ can be calculated by $\underline{w}=(\lambda Rxx\underline{w}-Ryy^O\underline{w})(Ryy^D)^{-1}$, where $\underline{x}$ denotes a second signal vector, $\underline{y}$ denotes a first signal vector, Rxx denotes the autocovariance matrix of the $\underline{x}$, Ryy denotes the autocovariance matrix of the $\underline{y}$, $Ryy^D$ denotes a matrix of diagonal components of the Ryy, $Ryy^O$ denotes a matrix of non-diagonal components of the Ryy, $(Ryy^D)^{-1}$ denotes an inverse matrix of the $Ryy^D$, and $\lambda$ denotes a greatest proper value of $Ryy\underline{w}-\lambda Rxx\underline{w}$, which is a generalized Eigenvalue problem.

10. A method as claimed in claim 9, wherein the greatest proper value $\lambda$ of $Ryy\underline{w}-\lambda Rxx\underline{w}$, which is a generalized Eigenvalue problem, can be calculated by $$\lambda = \frac{w^H R_{yy} w}{w^H R_{xx} w}$$

with respect to 'H', the Hermitian operator.

11. A method as claimed in claim 8, wherein the weight vector $\underline{w}$ can be calculated by $\underline{w}(k+1)=\lambda Rxx\underline{w}(k)(Ryy^D)^{-1}-Ryy^O\underline{w}(k)(Ryy^D)^{-1}$, where $\underline{x}$ denotes a second signal vector, $\underline{y}$ denotes a first signal vector, Rxx denotes the autocovariance matrix of the $\underline{x}$, Ryy denotes the autocovariance matrix of the $\underline{y}$, $Ryy^D$ denotes a matrix of diagonal components of the Ryy, $Ryy^O$ denotes a matrix of non-diagonal components of the Ryy, $(Ryy^D)^{-1}$ denotes an inverse matrix of the $Ryy^D$, and $\lambda$ denotes a greatest proper value of $Ryy\underline{w}-\lambda Rxx\underline{w}$, which is a generalized Eigenvalue problem.

12. A method as claimed in claim 7, wherein the separated matrix is the autocovariance matrix of the second signal.

13. A method as claimed in claim 12, wherein the weighted value $\underline{w}$ can be calculated by $$\underline{w} = \frac{\{R_{yy}(R_{xx}^D)^{-1} - \lambda R_{xx}^O(R_{xx}^D)^{-1}\}\underline{w}}{\lambda}$$

where $\underline{x}$ denotes a second signal vector, $\underline{y}$ denotes a first signal vector, Rxx denotes the autocovariance matrix of the $\underline{x}$, Ryy denotes the autocovariance matrix of the $\underline{y}$, $Rxx^D$ denotes a matrix of diagonal components of the Rxx, $Rxx^O$ denotes a matrix of non-diagonal components of the Rxx, $(Rxx^D)^{-1}$ denotes an inverse matrix of the $Rxx^D$, and $\lambda$ denotes a greatest proper value of $Ryy\underline{w}-\lambda Rxx\underline{w}$, which is a generalized Eigenvalue problem.

14. A method as claimed in claim 12, wherein the weighted value $\underline{w}$ can be renewed with respect to a snapshot index 'k' and a following snapshot index (k+1) by $$\underline{w}(k+1) = \frac{\{R_{yy}(R_{xx}^D)^{-1} - \lambda R_{xx}^O(R_{xx}^D)^{-1}\}\underline{w}(k)}{\lambda}$$

where $\underline{x}$ denotes a second signal vector, $\underline{v}$ denotes a first signal vector, Rxx denotes the autocovariance matrix of the $\underline{x}$, Ryy denotes the autocovariance matrix of the $\underline{y}$, $Rxx^D$ denotes a matrix of diagonal components of the Rxx, $Rxx^O$ denotes a matrix of non-diagonal components of the Rxx, $(Rxx^D)^{-1}$ denotes an inverse matrix of the $Rxx^D$, and $\lambda$ denotes a greatest proper value of $Ryy\underline{w}-\lambda Rxx\underline{w}$, which is a generalized Eigenvalue problem.

15. A method as claimed in claim 12, wherein the greatest proper value $\lambda$ of $Ryy\underline{w}-\lambda Rxx\underline{w}$, which is a generalized Eigenvalue problem, can be calculated by $$\lambda = \frac{w^H R_{yy} w}{w^H R_{xx} w}$$

with respect to 'H', the Hermitian operator.

* * * * *